May 23, 1933.                H. MARLES                1,910,300
                  BUSHING FOR MOTOR CAR STEERING COLUMNS
                          Filed May 7, 1928
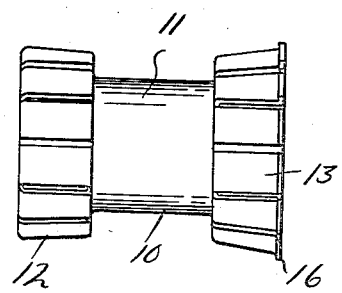
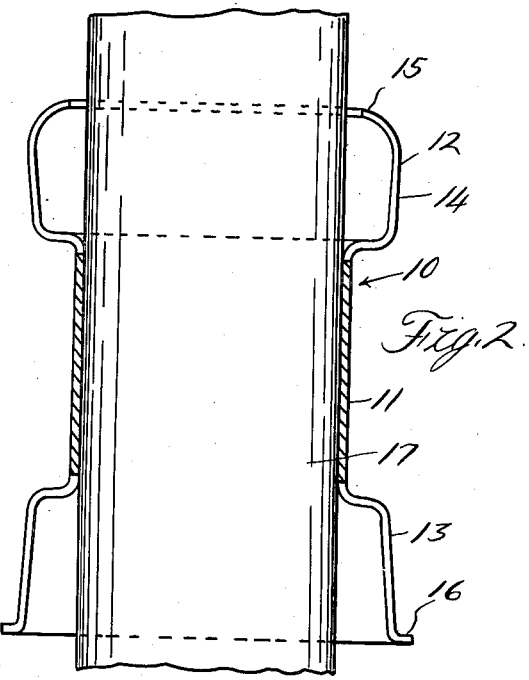
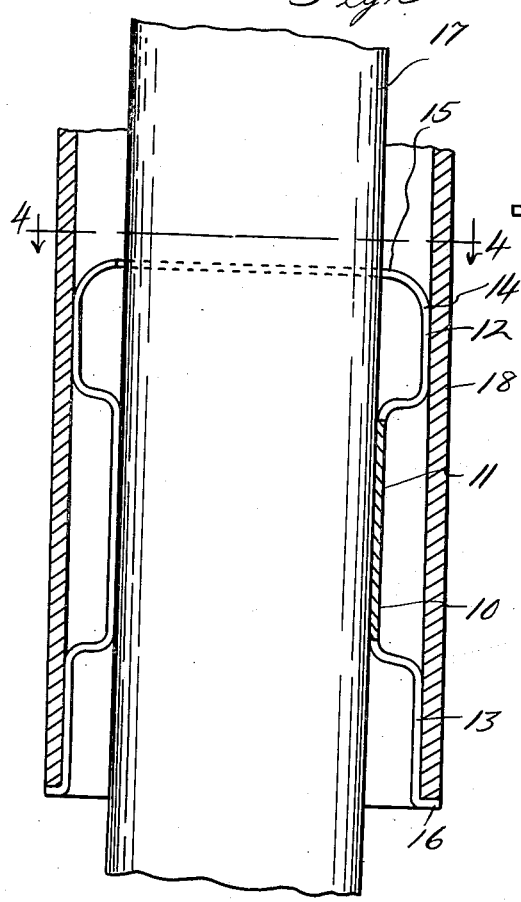
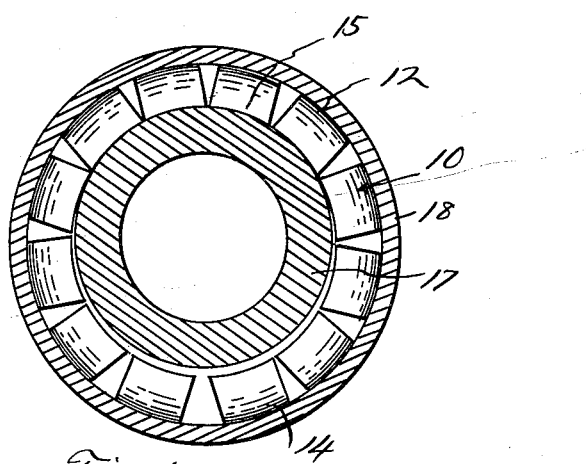
Inventor
Henry Marles
By  Whittemore Hulbert
    Whittemore & Belknap
                    Attorneys Patented May 23, 1933

1,910,300

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

BUSHING FOR MOTOR CAR STEERING COLUMNS

Application filed May 7, 1928. Serial No. 275,950.

This invention relates generally to bushings and refers particularly to bushings for separating the control rods from the outer casings of motor vehicle steering columns.

It is a recognized fact that solid bushings are the most efficient for such use but because of manufacturing inaccuracies in the rods or tubes, it is necessary to provide bushings which are sufficiently resilient to compensate for such inaccuracies. While bushings have been designed for this purpose, it has been found that in most instances they allow unlimited movement between the rod and the outer casing and thereby permit these parts to contact and cause a rattling of one against the other during the operation of the vehicle.

It is therefore the primary object of the present invention to provide a bushing which is sufficiently resilient to permit a limited relative movement between the rod and casing but which will function as a solid bushing after permitting such movement and thereby eliminate the objectionable rattling of the parts mentioned above.

With the above and other objects in view the invention consists in certain novel features of construction, combinations and arrangements of parts as will be more fully described and particularly pointed out in the appended claims.

In the drawing:

Figure 1 is a side elevation of a bushing made in accordance with the present construction;

Figure 2 is an enlarged fragmentary sectional view;

Figure 3 is a view of the bushing assembled upon a steering column;

Figure 4 is a section taken on line 4—4 of Figure 3.

Referring now to the drawing, the numeral 10 designates a split bushing formed from sheet metal and having a tubular body portion 11 provided with two circumferential series of resilient fingers projecting from opposite ends thereof and constituting contractable bearings 12 and 13. Each finger 14 is formed integral with the body portion and as clearly shown in Figure 2 projects radially outward and is disposed at an inclination to the body. The outer ends of the fingers of the series 12 are preferably bent inwardly to form stops 15 but each finger of the series 13 has its outer end bent outwardly to form with the other fingers of this series, a circumferential ring or stop 16.

In use, the bushing is slipped upon the control rod 17 in the manner shown in Figure 3 with the body portion 11 snugly engaging the rod and the fingers of each series resiliently engaging the inner face of the outer casing 18. The ring 16 formed by the series of fingers 13 is adapted to abut against an end of the casing for positioning the bushing longitudinally of the rod and outer casing.

With this arrangement each finger will flex independently of the other fingers and will permit a limited lateral movement of the rod relative to the outer casing for taking care of any manufacturing inaccuracies in the rod or casing. Just as soon, however, as any set of adjacent fingers of the series 12 are flexed to such an extent that their longitudinal body portions are parallel to the tubular body, the stops 15 will contact and prevent any further inward movement of the fingers. These fingers will therefore cooperate to form rigid portions of the bushing and thereby prevent the control rod from rattling against the outer casing. This is also true of the series of fingers 13 with the exception that a greater compression of these fingers must take place before they form rigid portions of the bushing due to the fact that the ends of each of these fingers are bent outwardly instead of inwardly as in the case of the other series of fingers.

It is apparent therefore that I have designed a bushing which not only has the desired qualities of a solid bushing but which also is sufficiently resilient to permit a limited movement between parts which the bushing is adapted to separate. It will also be apparent that while the present bushing is primarily designed for use between a control rod and outer casing of a steering column, it is not necessarily limited to such use, but may be employed for many other purposes.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. A bushing comprising a tubular body portion having a series of independently movable radially projecting resilient fingers forming a contractable bearing, and cooperating stops on adjacent fingers for limiting the radial contraction thereof.

2. A bushing comprising a tubular body portion having a circumferential series of radially projecting fingers at one end thereof, each finger being normally inclined to said tubular body portion and cooperating stops on adjacent fingers for preventing further compression thereof when said fingers are substantially parallel to said body.

3. A bushing for spacing the outer casing of a steering column from a control rod, comprising a tubular body portion adapted to surround said rod, and a plurality of radially projecting fingers extending from opposite ends of said body portion for engagement with the inner face of the outer casing.

4. A bushing for spacing the outer casing of a steering column from a control rod comprising a tubular body portion adapted to surround said rod, and a plurality of radially projecting resilient fingers extending from opposite ends of said body portion for engagement with the inner face of the outer casing, said fingers being capable of a limited compression for permitting limited adjustment of said rod relative to said outer casing.

5. A bushing comprising a tubular body portion having spaced radially projecting flexible fingers, said fingers having portions arranged in circumferential alignment around the body portion and adapted to engage each other when flexed a predetermined amount to form with the body portion a rigid bushing.

6. A bushing comprising a tubular body portion having spaced radially projecting flexible fingers, said fingers having portions inclined to the axis of the bushing and arranged circumferentially around the body portion and adapted to engage each other when flexed a predetermined amount to form with the body portion a rigid bushing.

7. A bushing comprising a tubular body portion terminating at one end in a series of radially projecting flexible fingers having portions normally spaced from each other and extending longitudinally of the bushing in juxtaposition to each other and adapted to engage each other when flexed a predetermined amount to form with the body portion a rigid bushing.

8. A bushing comprising a tubular body portion having axially spaced groups of radially projecting flexible fingers normally spaced from each other, each group of fingers having portions extending longitudinally of the bushing in juxtaposition to each other and adapted to engage each other when flexed a predetermined amount to form with the body portion a rigid bushing.

9. A bushing for spacing two telescopic engaging members from each other, comprising a tubular body portion adapted to surround one of the members and having a plurality of radially projecting contractable fingers engageable with the other of said members, and projections upon said fingers engaging one end portion of one of said members for positioning the bushing relative to the members.

10. A bushing comprising a tubular body portion having a series of circumferentially extending independently movable flexible fingers arranged in juxtaposition to each other and adapted to engage each other when flexed a predetermined amount to form with the body portion aforesaid a rigid bushing.

11. A bushing for spacing two telescopic members from each other, comprising a tubular body portion engaging one of said members and having a circumferential series of flexible fingers at opposite ends thereof spaced radially from the tubular portion and forming spaced flexible bearing surfaces for the other of said members.

12. A bushing for spacing two telescopic members from each other, comprising a tubular body portion engageable with one of the members and having a circumferential series of radially projecting fingers at one end thereof forming a radially contractable bearing surface for the other of said members, and cooperating means upon adjacent fingers for limiting contraction thereof.

13. A bushing for spacing two telescopic members from each other, comprising a tubular portion engaging one of said members and a slotted portion spaced radially from the tubular portion forming a contractable bearing surface for the other member, and means projecting radially from the portions on opposite sides of each of the slots forming stops for limiting contraction of said bearing surface.

14. A bushing for spacing two telescopic members from each other, comprising a tubular body portion engaging one of said members and having independently movable fingers spaced radially from the body portion forming a contractable substantially axially extending bearing surface for the other member and capable of being contracted until adjacent portions thereof contact so as to limit relative lateral movements of the members.

15. A bushing for spacing two telescopic members from each other, comprising a tubular body portion engageable with one of said members, and independently movable fingers spaced radially from the body portion and engageable with the other of said members substantially throughout the length thereof to form a contractable bearing therefor.

16. A bushing comprising a tubular body portion having a series of circumferentially extending independently movable flexible fingers spaced radially outwardly from the body portion and fashioned to engage each other when flexed to form a rigid bearing surface of greater diameter than the body portion.

17. A bushing comprising a body portion having a series of circumferentially extending independently movable flexible fingers spaced radially outwardly from the body portion and having portions engageable with each other when flexed to form a rigid bearing surface of greater dimension than the body portion.

In testimony whereof I affix my signature.

HENRY MARLES.